Patented Apr. 23, 1929.

1,709,892

UNITED STATES PATENT OFFICE.

CHARLES D. WOOD, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE.

METHOD OF USING SODIUM SILICATE ADHESIVES.

No Drawing.   Application filed July 21, 1926. Serial No. 124,100.

This invention relates to methods of using adhesive compositions consisting essentially of silicate of soda.

Silicate of soda in solution, alone or in admixtures with other materials, has wide application as an adhesive in many arts, as, for example, in the manufacture of artificial lumber, composite metal and fiber sheets, flue dust briquettes, fuel briquettes, and in the fiberboard and boxboard industries.

The viscosity of the silicate always has been considered of the utmost importance in determining its adhesive qualities, and this viscosity is directly dependent upon the temperature, the specific gravity, and the ratio of alkali to silica in the water glass dissolved to make up the solution.

In the various arts where silicate of soda is employed as an adhesive it always has been deemed necessary to use the silicate cold, or at ordinary room temperature (i. e., about 50–70° F.), as its adhesive qualities were thought to be lessened when the silicate was used at higher temperatures.

For example, in the manufacture of fiberboard and boxboard and the like wherein a plurality of plies of paper or paperboard are cemented to each other by films of an adhesive, making a product of two or more plies, it is the general practice to use as the adhesive silicate of soda solution, alone or in admixtures, cold or at room temperature. It has been considered detrimental to the adhesive effect of the silicate of soda to use it at temperatures appreciably above 70° F. It is customary, therefore, for manufacturers of this adhesive to determine tests thereon, and standardize the quality of various grades thereof, at temperatures below 70° F.

One object of this invention is to devise a method whereby silicate of soda solution may be spread upon, or admixed with, material in a more expeditious and efficient manner than heretofore known.

I have discovered that silicate of soda solution, when raised to a temperature appreciably higher than 70° F., becomes more efficient as an adhesive. At such temperatures its viscosity is lowered, permitting speedier and more efficient spreading or mixing. The bond produced between plies or particles of material is stronger. The speed of the subsequent drying of the product is materially increased.

The use of a hot silicate of soda composition as binding material in the manufacture of fuel briquettes and of artificial lumber (from sawdust or comminuted fibers) permits the acceleration of the mixing operation and, at the same time, produces a stronger bond between the particles of material, thus effecting an economy in the relative amount of adhesive necessary. In the case of fuel briquetting, it has been general practice to use approximately 5% by weight of 40° Bé. silicate of soda solution, based on the weight of the briquetting mixture; in the case of artificial lumber, about 25% of 42° Bé. silicate of soda solution has been used. In both of the above cases, economy in time of mixing and in relative amount of binder required is effected by the use of heated silicate of soda solution.

In some of the arts, as, for example, in the manufacture of veneer or laminated wood stock, it is customary to mix with silicate of soda solution some other material which may serve to thicken said solution and give to the composition more "body" or viscosity, such as, dextrine, other organic products, pulverized rock, earthy materials and other mineral products. It has been found, further, that the use of such compositions, at temperatures appreciably above 70° F. also admits of acceleration in the spreading operation and produces a stronger bond than when employing the same compositions cold or at room temperatures.

In the manufacture of composite sheeted material comprising a plurality of plies, as, for example, corrugated and solid fiber shipping container stocks, where the stock for the various plies is used from the roll and the cementing operation is continuous, it has been found that the efficiency of the spreading operation (in increased area of surface spread per unit of time), and the adhesion between the plies, may be increased by using a silicate of soda adhesive at temperatures between about 90° F. and 150° F., preferably at about 120° F. This higher efficiency results in a material increase in the capacity of the equipment without additional investment. In certain instances it has been demonstrated that this method results in doubling and even more than doubling the capacity of a composite board making machine.

Contrary to expectations, this method does not result in the silicate of soda solution unduly soaking into the paper stock, nor does it produce tearing of the same.

In all probability the effect obtained may, in part, be attributed to better distribution of the silicate on the surface of the plied stock, due to decrease in viscosity of the adhesive as its temperature is increased, and also to the acceleration of the subsequent drying operation, on account of the increased temperature of the adhesive as spread. In addition, the adhesive effect of the silicate of soda composition is increased.

The temperature of the adhesive may be maintained by any convenient method. Indirect heating is preferred, although under certain conditions, direct heating, as by steam, gives good results. When using direct steam, dilution of the silicate of soda solution to a point where its adhesive properties are adversely affected must, of course, be avoided.

As has been indicated, the invention, i. e. the use of silicate of soda adhesives at elevated temperatures, is applicable generally to silicate of soda adhesives of widely varying viscosity and composition, and in referring to silicate of soda solutions or compositions containing silicate of soda without specifying any particular composition or viscosity, it is understood that I have reference to all such solutions or compositions as are capable of use as adhesives.

I claim:

1. In a method of making a composite board involving the cementing to each other of a plurality of plies of material by the use of an adhesive and applying pressure thereto, the steps which consist in maintaining a body of concentrated silicate of soda solution at a temperature substantially above room temperature but not above 150° F., and spreading said solution upon the plies of material without substantial cooling of the same.

2. In a method of making a composite board involving the cementing to each other of a plurality of plies of material by the use of an adhesive and applying pressure thereto, the steps which consist in maintaining a body of concentrated silicate of soda solution at a temperature of about 120° F., and spreading said solution upon the plies of material without substantial cooling of the same.

In testimony whereof, I affix my signature.

CHARLES D. WOOD.